United States Patent
Urakawa

(10) Patent No.: US 9,191,430 B2
(45) Date of Patent: *Nov. 17, 2015

(54) PROXY DEVICE RECEIVING SPECIFIC DATA FROM INSTRUCTION DEVICE IN RESPONSE TO TRANSMITTED RESPONSE DATA AND TRANSMITTING SPECIFIC DATA TO OUTPUTTING DEVICE WHICH OUTPUTS AN IMAGE AND LOCATION DATA INDICATING A LOCATION IN WHICH THE OUTPUT DATA IS STORED

(71) Applicant: BROTHER KOGYO KABUSHIKI KAISHA, Nagoya-shi, Aichi-ken (JP)

(72) Inventor: Yutaka Urakawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/281,247

(22) Filed: May 19, 2014

(65) Prior Publication Data

US 2014/0250207 A1    Sep. 4, 2014

Related U.S. Application Data

(63) Continuation of application No. 13/423,964, filed on Mar. 19, 2012, now Pat. No. 8,767,243.

(30) Foreign Application Priority Data

May 31, 2011    (JP) ................................ 2011-121514

(51) Int. Cl.
G06F 15/16    (2006.01)
H04L 29/08    (2006.01)
(Continued)

(52) U.S. Cl.
CPC .............. *H04L 67/02* (2013.01); *H04L 65/105* (2013.01); *H04N 1/00244* (2013.01);
(Continued)

(58) Field of Classification Search
None
See application file for complete search history.

(56) References Cited

U.S. PATENT DOCUMENTS 8,467,080 B2    6/2013    Kamijo
2002/0138557 A1    9/2002    Mukaiyama et al.
(Continued)

FOREIGN PATENT DOCUMENTS

CN    101472034 A    7/2009
JP    2001101091 A    4/2001
(Continued)

OTHER PUBLICATIONS

Office Action issued in related Chinese application No. 201210086259.3, mailed Aug. 5, 2014.

*Primary Examiner* — Vincent Rudolph
*Assistant Examiner* — Richa Mishra
(74) *Attorney, Agent, or Firm* — Merchant & Gould PC

(57) ABSTRACT

In a proxy device, an acquiring unit acquires one of outputting-device-identification data and instruction-device-identification data from a storing unit. The storing unit stores the outputting-device-identification data associated with the instruction-device-identification data. A first determining unit determines whether the acquired outputting-device-identification data is associated with the received instruction-device-identification data. A first transmitting unit transmits the received instruction data to the particular outputting device. A second receiving unit receives response data from the outputting device. A second transmitting unit transmits the received response data to the instruction device from which the received instruction data is transmitted. A third receiving unit receives specific data that is transmitted from the instruction device. The specific data is one of output data based on which the outputting device outputs an image and location data indicating a location of the output data. A third transmitting unit transmits the received specific data to the outputting device.

17 Claims, 10 Drawing Sheets

(51) Int. Cl.
*H04L 29/06* (2006.01)
*H04N 1/00* (2006.01)
*H04N 1/44* (2006.01)

(52) U.S. Cl.
CPC ........ *H04N 1/00307* (2013.01); *H04N 1/4413* (2013.01); *H04N 1/4426* (2013.01); *H04N 1/4433* (2013.01); *H04N 2201/0075* (2013.01); *H04N 2201/0094* (2013.01)

(56) References Cited

U.S. PATENT DOCUMENTS

| | | |
|---|---|---|
| 2002/0161830 A1 | 10/2002 | Mukaiyama et al. |
| 2002/0161831 A1 | 10/2002 | Nakaoka et al. |
| 2002/0186408 A1 | 12/2002 | Nakaoka et al. |
| 2003/0048484 A1 | 3/2003 | Seki et al. |
| 2003/0093675 A1 | 5/2003 | Hibino et al. |
| 2006/0114109 A1 | 6/2006 | Geissler |
| 2007/0027990 A1 | 2/2007 | Nakaoka et al. |
| 2007/0079006 A1 | 4/2007 | Oya |
| 2010/0238501 A1 | 9/2010 | Fujimaki |
| 2011/0179354 A1 | 7/2011 | Park |

FOREIGN PATENT DOCUMENTS

| | | |
|---|---|---|
| JP | 2002082867 A | 3/2002 |
| JP | 2003084945 A | 3/2003 |
| JP | 2003-173251 A | 6/2003 |

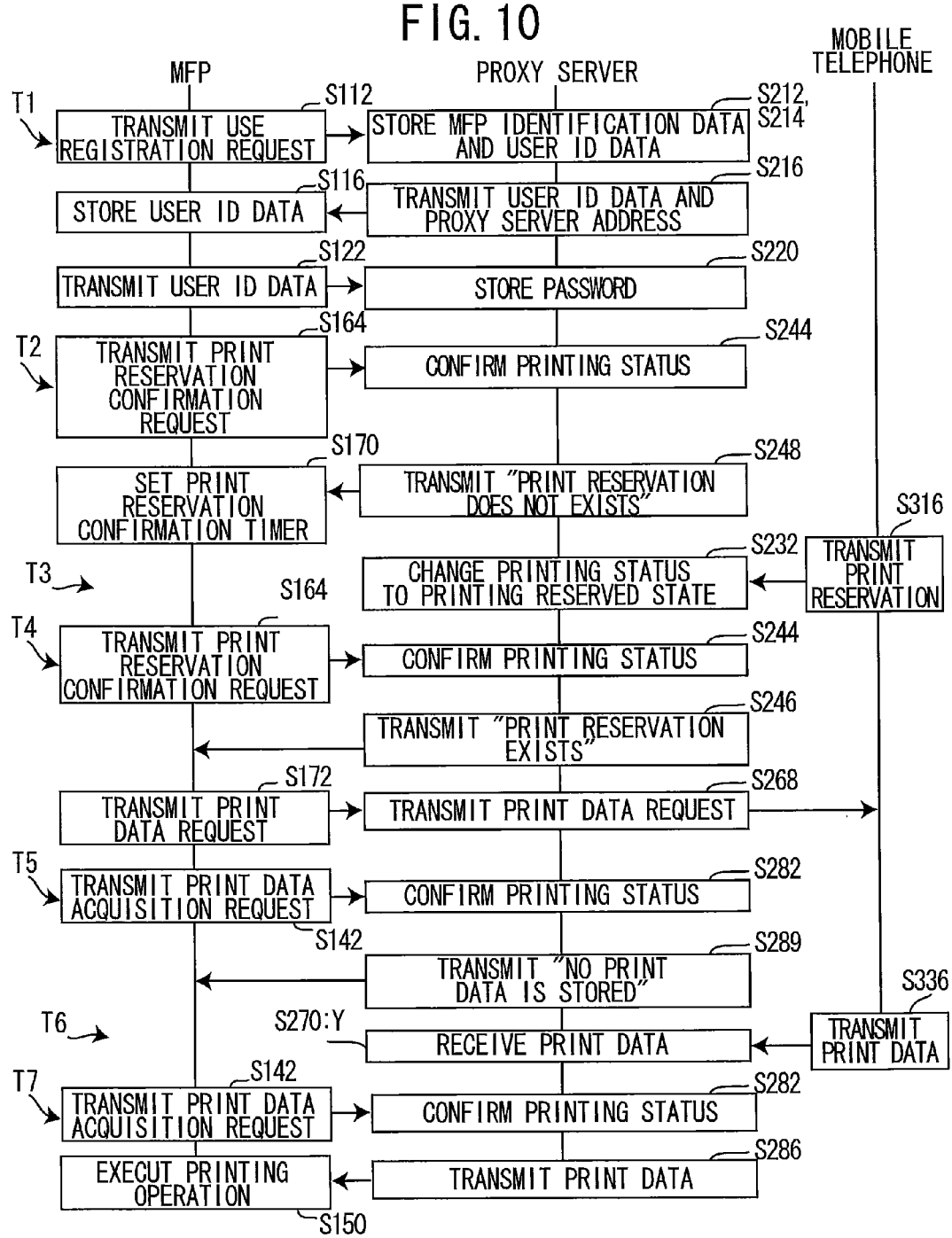

PROXY DEVICE RECEIVING SPECIFIC DATA FROM INSTRUCTION DEVICE IN RESPONSE TO TRANSMITTED RESPONSE DATA AND TRANSMITTING SPECIFIC DATA TO OUTPUTTING DEVICE WHICH OUTPUTS AN IMAGE AND LOCATION DATA INDICATING A LOCATION IN WHICH THE OUTPUT DATA IS STORED

CROSS REFERENCE TO RELATED APPLICATION

This application is a continuation of U.S. application Ser. No. 13/423,964, filed Mar. 19, 2012, which claims priority from Japanese Patent Application No. 2011-121514 filed May 31, 2011. The entire contents of the above noted applications are incorporated herein by reference.

TECHNICAL FIELD

The invention relates to a proxy device connected to a terminal device and an image-outputting device.

BACKGROUND

Japanese patent application publication No. 2001-101091 describes a system that includes a client, a proxy server, and a printer. In this system, the client transmits the URL for a file to be printed and a print command to the printer. The printer transfers the file URL to a proxy server. The proxy server acquires the file identified by the URL from a file server and returns this file to the printer. The printer then performs a printing operation based on the file received from the proxy server.

SUMMARY

With the conventional technology described above, the proxy server acquires a file from the file server using a file acquisition request when the client transmits the file URL and print command to the printer, and the proxy server must store the acquired file until the printer has completed the printing operation. This can lead to problems with storage capacity if the proxy server must store a large volume of data. The invention in the following specification provides a technology capable of overcoming such disadvantages.

In order to attain the above and other objects, the invention provides a proxy device. The proxy device may include a communication unit configured to communicate with a plurality of outputting devices and a plurality of instruction devices, and a processor. The processor may function as an acquiring unit, a first receiving unit, a first determining unit, a first transmitting unit, a second receiving unit, a second transmitting unit, a third receiving unit, and a third transmitting unit. The acquiring unit may acquire at least one of outputting-device-identification data and instruction-device-identification data from a storing unit. The outputting-device-identification data may identify a particular outputting device from among the plurality of outputting devices. The instruction-device-identification data identifies a particular instruction device from among the plurality of instruction devices. The storing unit may store the outputting-device-identification data associated with the instruction-device-identification data. The first receiving unit may receive, via the communication unit, instruction-device-identification data and instruction data. The first determining unit may determine whether the acquired outputting-device-identification data is associated with the received instruction-device-identification data. The first transmitting unit may transmit, via the communication unit, the received instruction data to the particular outputting device in response to determining that the particular outputting device identified by the acquired outputting-device-identification data is associated with the received instruction-device-identification data in the storing unit. The instruction data may instruct the determined outputting device to output an image. The second receiving unit may receive, via the communication unit, response data from the particular outputting device in response to the instruction data transmitted by the first transmitting unit. The second transmitting unit may transmit, via the communication unit, the received response data to the instruction device from which the received instruction data is transmitted. The third receiving unit may receive, via the communication unit, specific data that is transmitted from the instruction device in response to the response data transmitted to the instruction device by the second transmitting unit. The specific data may be one of output data based on which the outputting device outputs an image and location data indicating a location in which the output data is stored. The third transmitting unit may transmit the received specific data to the particular outputting device.

According to another aspect, the invention provides a system. The system may include a proxy server, a plurality of outputting devices communicable with the proxy server via a local area network and Internet, and a plurality of instruction devices communicable with the proxy server. The proxy device may include a communication unit configured to communicate with a plurality of outputting devices and a plurality of instruction devices, and a processor. The processor may function as an acquiring unit, a first receiving unit, a first determining unit, a first transmitting unit, a second receiving unit, a second transmitting unit, a third receiving unit, and a third transmitting unit. The acquiring unit may acquire at least one of outputting-device-identification data and instruction-device-identification data from a storing unit. The outputting-device-identification data may identify a particular outputting device from among the plurality of outputting devices. The instruction-device-identification data identifies a particular instruction device from among the plurality of instruction devices. The storing unit may store the outputting-device-identification data associated with the instruction-device-identification data. The first receiving unit may receive, via the communication unit, instruction-device-identification data and instruction data. The first determining unit may determine whether the acquired outputting-device-identification data is associated with the received instruction-device-identification data. The first transmitting unit may transmit, via the communication unit, the received instruction data to the particular outputting device in response to determining that the particular outputting device identified by the acquired outputting-device-identification data is associated with the received instruction-device-identification data in the storing unit. The instruction data may instruct the determined outputting device to output an image. The second receiving unit may receive, via the communication unit, response data from the particular outputting device in response to the instruction data transmitted by the first transmitting unit. The second transmitting unit may transmit, via the communication unit, the received response data to the instruction device from which the received instruction data is transmitted. The third receiving unit may receive, via the communication unit, specific data that is transmitted from the instruction device in response to the response data transmitted to the instruction device by the second transmitting unit. The specific data may be one of output data based on which the outputting device outputs an image and location data indicating a location in which the output data is stored. The third transmitting unit may transmit the received specific data to the particular outputting device.

According to another aspect, the invention provides an outputting device that outputting-device-identification data identifies. The outputting may include a communication unit communicable with a proxy device via Internet; an outputting unit configured to output an image; and a processor. The processor may function as a requesting unit, a first receiving unit, a transmitting unit, a second receiving unit, and a performing unit. The requesting unit may transmit, via the communication unit, request data requesting the proxy device to store the outputting-device-identification data in association with instruction-device-identification data identifying an instruction device with which the proxy device communicable. The first receiving unit may receive instruction data that the proxy device relays, in response to the request data transmitted by the requesting unit, from the instruction device identified by the instruction-device-identification data stored in association with the outputting-device-identification data, the instruction data instructing the outputting unit to output the image. The transmitting unit may transmit response data when the receiving unit receives the instruction data and when the outputting unit outputs the image. The second receiving unit may receive specific data that the proxy device relays from the instruction device in response to the response data transmitted by the transmitting unit. The specific data may be one of output data based on which the outputting device outputs an image and location data indicating a location in which the output data is stored. The performing unit may perform a process to output the image by using the outputting unit in response to the specific data received by the second receiving unit.

BRIEF DESCRIPTION OF THE DRAWINGS

In the drawings:

FIG. 10 is a sequence diagram of the printing system.

DETAILED DESCRIPTION

Figure 1:
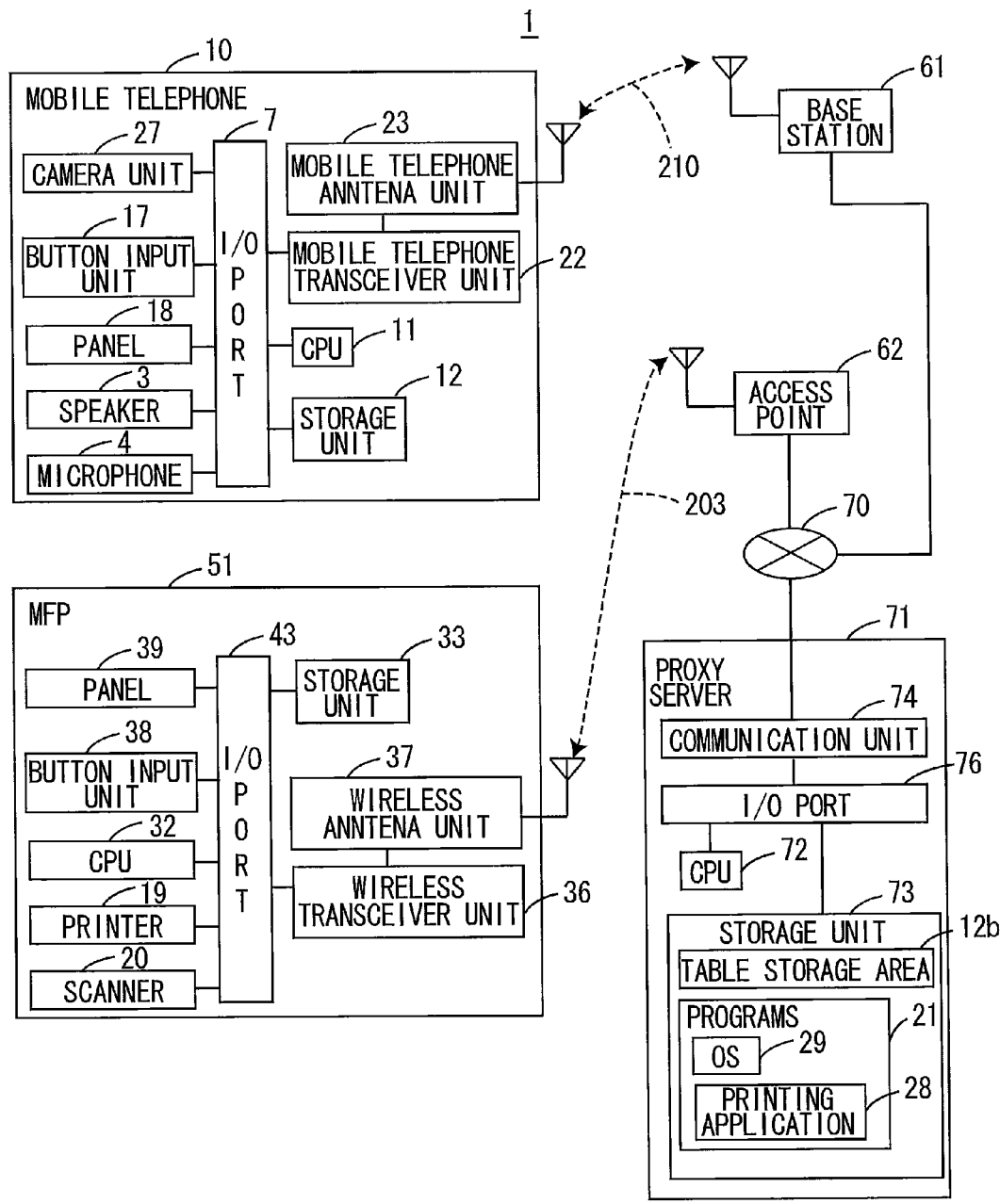
FIG. 1 is a printing system including a proxy server according to an embodiment of the invention.

As shown in FIG. 1, a printing system 1 includes a mobile telephone 10, a multifunction peripheral (MFP) 51, an access point 62, a proxy server 71, and a base station 61. The mobile telephone 10 and the MFP 51 function as wireless LAN terminal devices well known in the art. The MFP 51 is also provided with a printer function, a scanner function, and a copier function. The access point 62 functions as a wireless LAN access point known in the art. The proxy server 71 is connected to the base station 61 and access point 62 via an Internet 70.

The mobile telephone 10 is capable of performing wireless communications 210 with the base station 61 according to a method of mobile telephone communications, while the MFP 51 is capable of performing wireless communications 203 with the access point 62, exchanging digital signals representing various data. In addition, the base station 61, the access point 62, and the proxy server 71 can communicate with each other via the Internet 70. Hence, the proxy server 71 can perform data communications with the MFP 51 and the mobile telephone 10. The method of communications used by the wireless LAN system conforms to the standard IEEE 802.11a/b/g/n, for example.

Structure of the Proxy Server

Next, the structure of the proxy server 71 will be described. The proxy server 71 serves as a proxy for coordinating various data communications between a plurality of clients over a network. Here, the client is the mobile telephone 10, the MFP 51, for example. The proxy server 71 is primarily configured of a central processing unit (CPU) 72, a storage unit 73, and a communication unit 74. All of these components are interconnected via input/output ports 76.

The CPU 72 executes programs stored in the storage unit 73. The communication unit 74 exchanges various information with the mobile telephone 10, the MFP 51, and the like through communications.

The storage unit 73 includes a combination of a random access memory (hereinafter, referred to as RAM), a read-only memory (hereinafter, referred to as ROM), a flash memory, a hard disk, and a buffer provided for the CPU 72. The storage unit 73 stores programs 21. The programs 21 include a printing application 28 and an operating system (hereinafter, referred to as OS) 29. The OS 29 further includes a program for controlling the communication unit 74 to implement communications. The OS 29 also provides an application programming interface (hereinafter, referred to as API) through which programs can acquire data acquired by various hardware or through which the programs can command the hardware. The printing application 28 serves to instruct the CPU 72 to implement operations on the printing system 1, as will be described later.

The storage unit 73 also has a table storage area 12b. The table storage area 12b is used to store such data as MFP identification data, user ID data, and a password, a proxy server address, a mobile telephone address, and a printing status. The MFP identification data serves to identify a specific MFP among a plurality of MFPs. The device serial number is one example of MFP identification data. The user ID data and the password serve to identify a user who uses the printing system 1. A username is one example of the user ID data. The proxy server address is the e-mail address of the proxy server 71. The proxy server address is used when transmitting various information and print data from the mobile telephone 10 or the MFP 51 to the proxy server 71. A user or the like may store this proxy server address in the table storage area 12b in advance. The mobile telephone address is the e-mail address of the mobile telephone 10. The mobile telephone address is used when the proxy server 71 transmits various information to the mobile telephone 10. The printing status is data representing the current state of the printing system 1. One of four states is saved as the printing status. The four states include an initial state, a printing-reserved state, a data-requested state, and a data-provision waiting state. The printing status is one byte worth of data. In the embodiment, the printing status is set to the values "1", "2", "3", and "4" for the "initial state," "printing-reserved state," "data-requested state," and "data-provision waiting state," respectively.

Structure of the Mobile Telephone

Next, the structure of the mobile telephone 10 will be described. As shown in FIG. 1, the mobile telephone 10 primarily includes a CPU 11, a storage unit 12, a button input unit 17, a panel 18, a mobile telephone transceiver unit 22, a mobile telephone antenna unit 23, and a camera unit 27. The CPU 11 executes programs stored in the storage unit 12. The mobile telephone 10 is also provided with a speaker 3 and a microphone 4 for implementing a telephone call and voice input. All of the above components are interconnected via an input/output port 7.

The mobile telephone transceiver unit 22 implements wireless communications 210 with the base station 61 via the mobile telephone antenna unit 23 in conformance with a mobile telephone communication method. The button input unit 17 and the camera unit 27 accept operations performed by the user of the mobile telephone 10. The panel 18 displays information about the functions of the mobile telephone 10. The camera unit 27 photographs a prescribed range of view with a charge-coupled device or the like to acquire image data. The structure of the storage unit 12 is identical to the storage unit 73 of the proxy server 71 described above and, hence, will not be described here.

Structure of the MFP

Next, the structure of the MFP 51 will be described. The MFP 51 primarily includes a CPU 32, a storage unit 33, a wireless transceiver unit 36, a wireless antenna unit 37, a button input unit 38, a display panel 39, a printer 19, and a scanner 20, all of which components are interconnected via an input/output port 43.

The CPU 32 executes programs stored in the storage unit 33. The button input unit 38 includes keys for implementing various functions of the MFP 51. The display panel 39 displays various functional data for the MFP 51. The printer 19 executes printing operations. The scanner 20 executes image-reading operations. The structure of the storage unit 33 is identical to that of the storage unit 73 provided in the proxy server 71 and, hence, will not be described here.

Next, operations of the printing system 1 according to the embodiment will be described with reference to FIGS. 2 through 11. First, an overview of the printing system 1 will be described.

When the mobile telephone 10 instructs the MFP 51 to perform a printing operation, the mobile telephone 10 first notifies the proxy server 71 with a print reservation, rather than sending the print data itself. The proxy server 71 stores data indicating the print reservation.

When receiving a print reservation confirmation request from the MFP 51, the proxy server 71 notifies the MFP 51 whether a print reservation exists. The print reservation confirmation request is data that the MFP 51 transmits to the proxy server 71 to inquire whether the mobile telephone 10 has transmitted a print reservation to the proxy server 71. The print reservation confirmation request also includes user ID data and a password from which the MFP 51 is identified.

If a print reservation has been made, the MFP 51 transmits a print data request to the proxy server 71 when the MFP 51 is ready to execute the printing operation. Upon receiving the print data request from the MFP 51, the proxy server 71 issues a request to the mobile telephone 10 for the print data. When the print data is received from the mobile telephone 10, the proxy server 71 transfers this print data to the MFP 51. The MFP 51 receives the print data and executes the printing operation.

Operations of the Proxy Server

Next, the operations of the proxy server 71 will be described with reference to the flowcharts in FIGS. 2 through 4. In S210 at the beginning of the process in FIG. 2, the CPU 72 determines whether a use registration request transmitted according to HTTP has been received from the MFP 51. The use registration request is data requesting initiation of a use registration process. The use registration process is performed to register the MFP 51 on the proxy server 71 in order that the proxy server 71 can control the MFP 51 to perform printing operations based on user commands received from the mobile telephone 10. The use registration request includes data indicating that the request is a use registration request, and MFP identification data identifying the MFP 51. The MFP identification data enables the proxy server 71 to recognize the MFP 51, and more specifically is a device serial number that was stored in the MFP 51 at the factory. The use registration process may be performed one time when the user wishes to register the MFP 51 on the proxy server 71.

When the proxy server 71 receives a use registration request (S210: YES), in S212 the CPU 72 reads the MFP identification data from the use registration request received from the MFP 51 and stores this data in the storage unit 73. In this case, the CPU 72 stores the MFP identification data identifying the MFP 51 that transmitted the use registration request. In S214 the CPU 72 generates user ID data and stores this data in the storage unit 73. The user ID data is a unique character string that enables the user to recognize the MFP 51 registers on the proxy server 71. In S216 the CPU 72 controls the communication unit 74 to transmit the user ID data and the proxy server address to the MFP 51. The proxy server address is the e-mail address of the proxy server and is required when the mobile telephone 10 transmits e-mail to the proxy server 71. The CPU 72 also issues a request to the MFP 51 for a password and the mobile telephone address, in order to confirm the mobile telephone 10 that transmitted the print reservation. The mobile telephone address is the e-mail address for the mobile telephone 10 that enables the proxy server 71 to identify the source mobile telephone 10 of the print reservation. The mobile telephone address also serves to identify the user of the mobile telephone 10. In S218 the CPU 72 determines whether a password and a mobile telephone address was received from the MFP 51. The CPU 72 continually loops back to S218 while the password and the mobile telephone address have not been received (S218: NO) and advances to S220 when the data has been received (S218: YES).

In S220 the CPU 72 stores the password and the mobile telephone address received from the mobile telephone 10 in the storage unit 73. Next, the CPU 72 stores the user ID data and the password in association with the MFP identification data in the table storage area 12b of the storage unit 73. The CPU 72 also stores the status "initial state" in the table storage area 12b in association with the MFP identification data, the user ID data, and the password serving as data for identifying the MFP 51. The CPU 72 also stores the data for identifying the MFP 51 in the table storage area 12b in association with the mobile telephone address, serving as data for identifying the mobile telephone 10.

In S222 the CPU 72 controls the communication unit 74 to transmit a registration-completed response to the MFP 51 and subsequently returns to S210.

However, if the proxy server 71 has not received a use registration request in S210 (S210: NO), in S230 the CPU 72 determines whether a print reservation was received from the mobile telephone 10. The print reservation is data indicating that a reservation has been made for a print job. The print reservation includes data indicating the print request, the mobile telephone address of the mobile telephone 10, and the user ID data and the password for the MFP 51. One byte of data is used to specify the print request. In other words, the data indicating a print request is smaller in size than the print data.

When a print reservation has been received (S230: YES), in S232 the CPU 72 identifies the MFP identification data corresponding to the user ID data and the password included in the print reservation by accessing the table storage area 12*b*. Next, the CPU 72 changes the printing status corresponding to the identified MFP identification data to "printing-reserved state." In S234 the CPU 72 controls the communication unit 74 to transmit a reservation-received notification to the mobile telephone 10 and subsequently returns to S210. Note that if the mobile telephone address included in the print reservation does not match the mobile telephone address associated with the user ID data and the password included in the print reservation in S232, the CPU 72 simply returns to S210. In other words, when the print reservation received from the mobile telephone 10 does not include the user ID data, the password, and the mobile telephone address received from the MFP 51 that are registered when the use registration request was performed for the MFP 51, it is probable that the print reservation was not received from a valid user. Therefore, in S232 the CPU 72 does not recognize the received print reservation as a valid reservation. When the CPU 72 does not recognize the received print reservation as a valid reservation in S232, the CPU 72 does not instruct the communication unit 74 to transmit a reservation-received notification to the mobile telephone 10. Further, the CPU 72 does not change the print status corresponding to the identified MFP identification data to the "printing-reserved state" and simply returns to S210.

However, if a print reservation was not received from the mobile telephone 10 in S230 (S230: NO), in S240 (see FIG. 3) the CPU 72 determines whether a print reservation confirmation request was received from the MFP 51. If a print reservation confirmation request was received (S240: YES), in S242 the CPU 72 identifies the MFP identification data associated with the user ID data and the password included in the print reservation confirmation request by accessing the table storage area 12*b*. In S244 the CPU 72 determines whether the current print status associated with the identified MFP identification data is the "printing-reserved state." If the printing status is currently the "printing-reserved state" (S244: YES), in S246 the CPU 72 controls the communication unit 74 to transmit response data indicating "print reservation exists" to the MFP 51. However, when the current printing status is not the "printing-reserved state" (S244: NO), in S248 the CPU 72 controls the communication unit 74 to transmit response data indicating "print reservation does not exist" to the MFP 51. Subsequently, the CPU 72 returns to S210.

On the other hand, when the CPU 72 determines in S240 that a print reservation confirmation request was not received from the MFP 51 (S240: NO), in S260 the CPU 72 determines whether a print data request was received from the MFP 51. A print data request is data serving to request that print data be transmitted to the MFP 51. The print data request includes the user ID data and the password for the MFP 51. When a print data request has been received (S260: YES), in S261 the CPU 72 controls the communication unit 74 to transmit a request-received notification to the MFP 51.

In S262 the CPU 72 identifies the MFP identification data associated with the user ID data and the password that were included in the print data request by accessing the table storage area 12*b*. In S264 the CPU 72 determines whether the current status associated with the MFP identification data identified in S262 is the "printing-reserved state." The CPU 72 returns to S210 (see FIG. 2) when determining that the printing status is not the "printing-reserved state" (S264: NO) and advances to S266 when determining that the current state is the "printing-reserved state" (S264: YES). In S266 the CPU 72 changes the printing status associated with the identified MFP identification data to the "data-requested state."

In S268 the CPU 72 controls the communication unit 74 to transmit a print data request to the mobile telephone 10. Specifically, the CPU 72 transmits a print data request to the mobile telephone 10 through e-mail using the mobile telephone address. The print data request is transmitted to the mobile telephone 10 identified by the mobile telephone address associated with the MFP identification data identified in S262. That is, the CPU 72 transmits the print data request to the mobile telephone 10 that transmitted the print reservation, that is, the mobile telephone 10 that is identified by using the user ID and the password of the print data request.

In S269 the CPU 72 determines whether data was received from the mobile telephone 10 indicating that the print data request was received, as a response to the print data request. The CPU 72 continues to loop back to S269 while a response has not been received from the mobile telephone 10 (S269: NO) and advances to S210 (see FIG. 2) when a response has been received (S269: YES).

On the other hand, when the CPU 72 determines in S260 that a print data request was not received from the MFP 51 (S260: NO), in S270 (see FIG. 4) the CPU 72 determines whether print data, which is included in an e-mail, for example, was received from the mobile telephone 10. The print data is data used by the MFP 51 to perform a printing operation on the printer 19.

When an e-mail including print data has been received (S270: YES), in S272 the CPU 72 accesses the table storage area 12*b* to identify the MFP identification data stored in association with the mobile telephone address that was the source of the transmitted e-mail including the print data. Thus, the mobile telephone address for the source of the transmitted print data can be identified by exchanging print data in e-mail. This method improves security since the CPU 72 can confirm whether the source of the e-mail used to transmit the print data matches the mobile telephone address registered by the user during the use registration process for the MFP 51.

In S274 the CPU 72 determines whether the current printing status associated with the MFP identification data identified in S272 is the "data-requested state." The CPU 72 returns to S210 when determining that the printing status is not the "data-requested state" (S274: NO) and advances to S276 when determining that the current status is the "data-requested state" (S274: YES).

In S276 the CPU 72 stores the print data in the storage unit 73. Here, the print data received from the mobile telephone 10 may be stored as is in the storage unit 73 or may be stored after first being processed to a format suitable for the MFP 51. In S278 the CPU 72 changes the printing status associated with the MFP identification data identified in S272 to the "data-provision waiting state." In S279 the CPU 72 controls the communication unit 74 to transmit data to the mobile telephone 10 indicating that print data has been received. Subsequently, the CPU 72 returns to S210 (see FIG. 2).

However, if the CPU 72 determines in S270 that print data was not received from the mobile telephone 10 (S270: NO), in S280 the CPU 72 determines whether a print data acquisition request has been received from the MFP 51. A print data acquisition request is data requesting to begin a process in which the MFP 51 acquires print data from the proxy server

71. The print data acquisition request includes the user ID data and the password of the MFP 51.

When the proxy server 71 receives a print data acquisition request (S280: YES), in S282 the CPU 72 identifies the MFP identification data associated with the user ID data and the password that were included in the print data acquisition request by accessing the table storage area 12*b*. In S284 the CPU 72 determines whether the current printing status stored in the table storage area 12*b* is the "data-provision waiting state." The CPU 72 advances to S289 when the printing status is not the "data-provision waiting state" (S284: NO) and transmits data to the MFP 51 indicating that no print data is stored. Subsequently, the CPU 72 returns to S210.

However, when the current printing status is the "data-provision waiting state" (S284: YES), in S286 the CPU 72 controls the communication unit 74 to transmit the print data to the MFP 51 that transmitted the print data request. In S288 the CPU 72 changes the printing status to the "initial state" and returns to S210 (see FIG. 2).

Operations of the MFP

Figure 6:
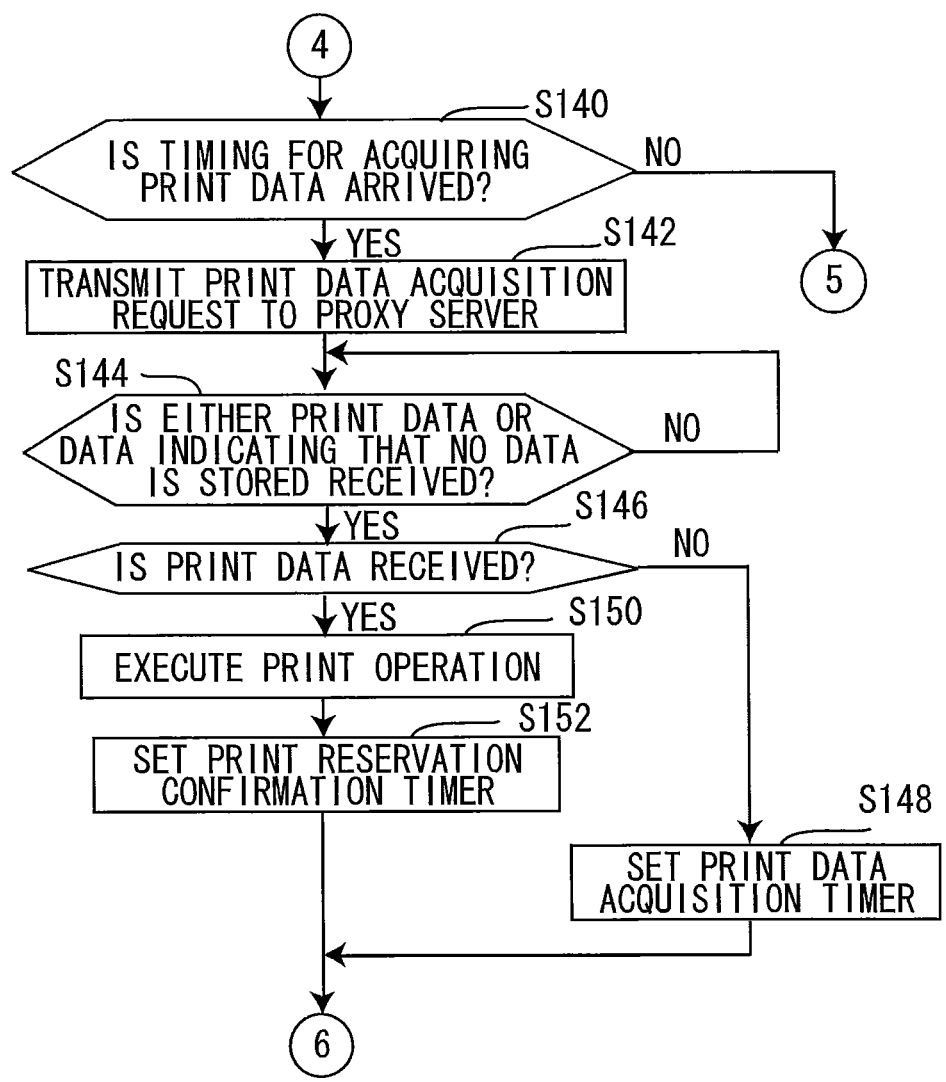
FIG. 6 is a flowchart illustrating a second first part of the whole process of a MFP that is subsequent to the first part.
Figure 7:
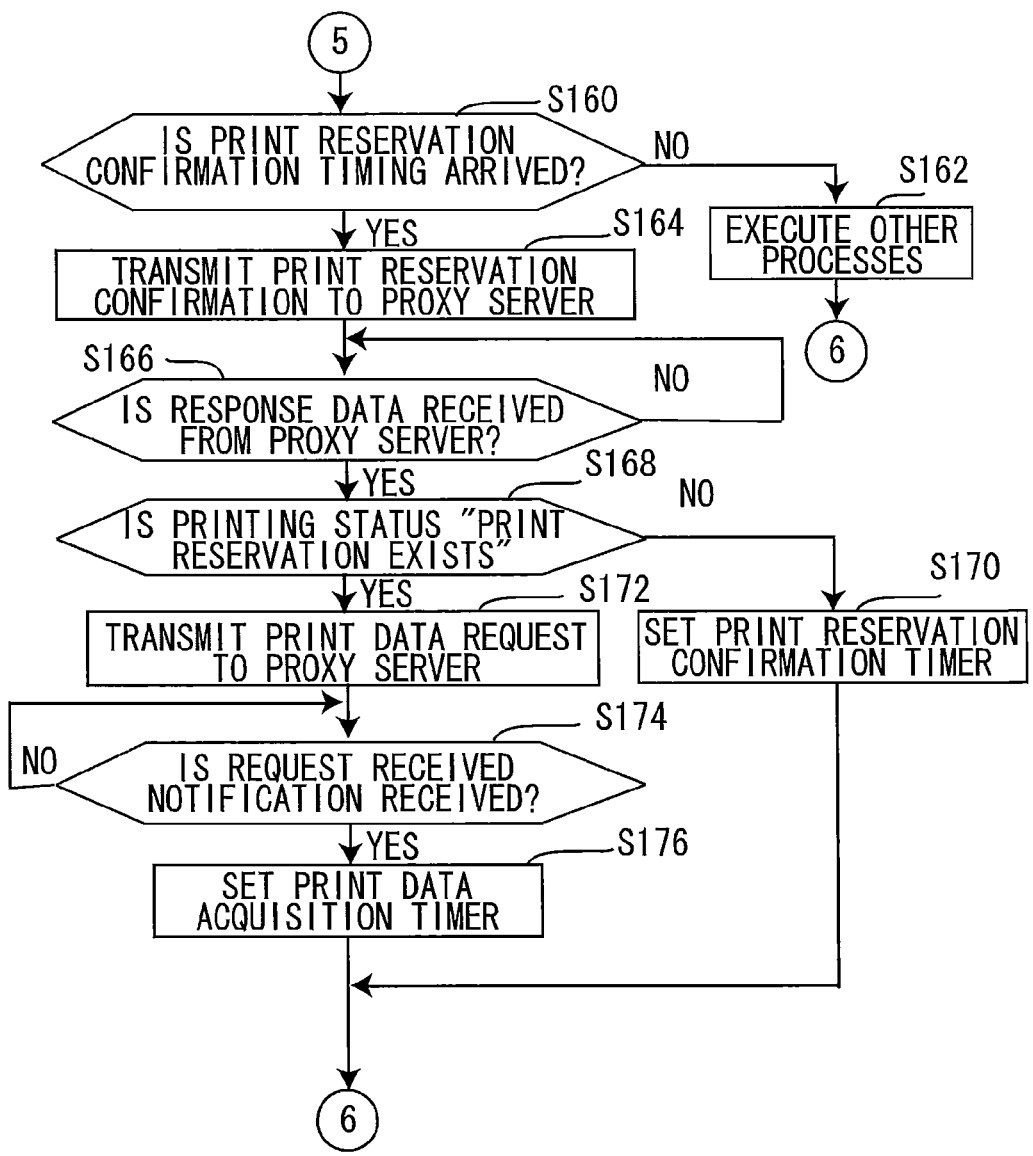
FIG. 7 is a flowchart illustrating a third part of the whole process of a MFP that is subsequent to the second part.

Next, operations of the MFP 51 will be described with reference to the flowcharts in FIGS. 5 through 7. The process shown in the flowcharts of FIGS. 5 through 7 begins when the MFP 51 is started.

Process for Transmitting a Use Registration Request, a Mobile Telephone Address, Etc.

Figure 5:
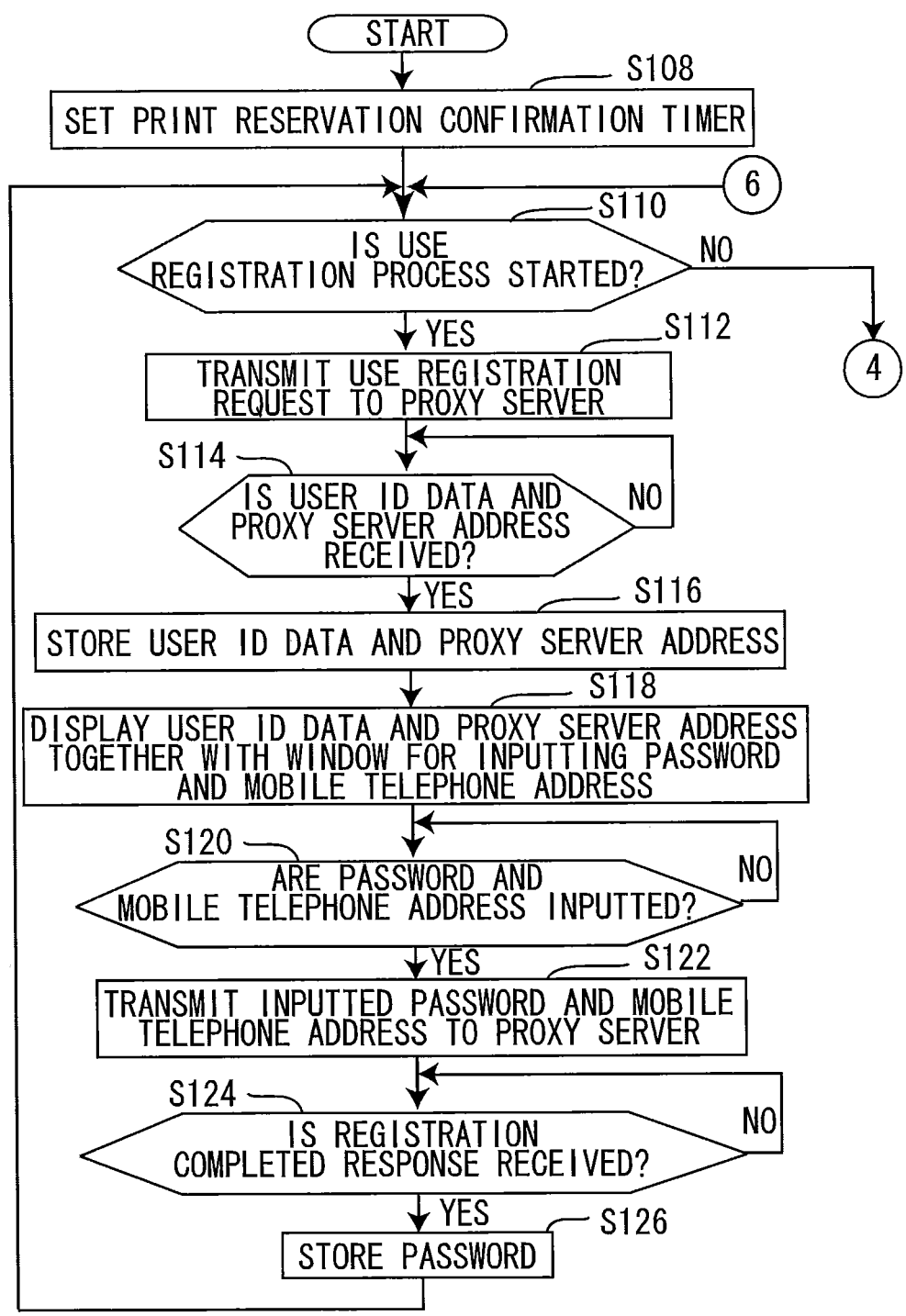
FIG. 5 is a flowchart illustrating a first part of a whole process of a MFP.

In S108 of FIG. 5 the CPU 32 sets a print reservation confirmation timer. The print reservation confirmation timer is used to determine whether a second wait time has elapsed. In S110 the CPU 32 determines whether the use registration process has been started. The use registration process is performed in order to register the MFP 51 on the proxy server 71 in order to use the MFP 51 in the printing system 1. In this process, the MFP 51 acquires from the proxy server 71 the user ID data with which the proxy server 71 has assigned the MFP 51, and a proxy server address required when the mobile telephone 10 transmits e-mail to the proxy server 71. Further, the MFP 51 transmits to the proxy server 71 the password and the mobile telephone address that must be inputted into the mobile telephone 10 for a print reservation. The CPU 32 accepts user input through the button input unit 38 to register various data.

When the use registration process has been initiated (S110: YES), in S112 the CPU 32 uses the wireless transceiver unit 36 to transmit a use registration request to the proxy server 71. Note that the URL of the proxy server 71 has already been stored in the MFP 51, and the MFP 51 can use this URL to transmit the use registration request according to HTTP. The MFP identification data is included in the use registration request. In S114 the CPU 32 determines whether the user ID data and the proxy server address was received from the proxy server 71 in response. The CPU 32 continually loops back to S114 while such data has not been received (S114: NO) and advances to S116 when the data has been received (S114: YES). In S116 the CPU 32 stores the user ID data and the proxy server address received in S114 in the storage unit 33. In S118 the CPU 32 displays the user ID data and the proxy server address in the display panel 39 together with a window for inputting the password and the mobile telephone address.

In S120 the CPU 32 determines whether the password and the mobile telephone address were inputted via the button input unit 38 and continually loops back to S120 when such data has not been inputted (S120: NO).

When the password and the mobile telephone address have been inputted (S120: YES), in S122 the CPU 32 uses the wireless transceiver unit 36 to transmit the inputted password and the mobile telephone address to the proxy server 71. In S124 the CPU 32 determines whether a registration-completed response was received from the proxy server 71. The CPU 32 returns to S114 if the registration-completed response was not received (S124: NO) and advances to S126 when the response was received (S124: YES). In S126 the CPU 32 stores the password in the storage unit 33, thereby completing the use registration process. Subsequently, the process returns to S110.

On the other hand, if the CPU 32 determines in S110 that the use registration process has not been started (S110: NO), in S140 (see FIG. 6) the CPU 32 determines whether the timing for acquiring print data has arrived based on a print data acquisition timer. The print data acquisition timer is used to determine whether a first wait time has elapsed and is set in S148 and S176 described later.

When the timing for print data acquisition has arrived (S140: YES), in S142 the CPU 32 uses the wireless transceiver unit 36 to transmit the print data acquisition request to the proxy server 71. In S144 the CPU 32 determines whether either print data or data indicating that no print data is stored was received from the proxy server 71. The CPU 32 returns to S144 when no response has been received (S144: NO).

However, when a response has been received (S144: YES), in S146 the CPU 32 determines whether the print data was received. If the print data was not received (S146: NO), in S148 the CPU 32 sets the print data acquisition timer and cancels the other timers. The CPU 32 subsequently returns to S110 (see FIG. 5). However, if the print data was received in S146 (S146: YES), in S150 the CPU 32 uses the print data to execute a printing operation on the printer 19. In S152 the CPU 32 sets the print reservation confirmation timer and cancels the other timers. Subsequently, the CPU 32 returns to S110 (see FIG. 5).

On the other hand, if the CPU 32 determines in S140 that the timing for the print data acquisition has not arrived (S140: NO), in S160 (see FIG. 7) the CPU 32 determines whether the print reservation confirmation timing has arrived based on the print reservation confirmation timer. The print reservation confirmation timer is set in S108, S152, and S170 (described later). If the timing for the print reservation confirmation has not arrived (S160: NO), in S162 the CPU 32 executes other processes, such as a process using the scanner 20, and returns to S110 (see FIG. 5). However, if the timing for the print reservation confirmation has arrived (S160: YES), in S164 the CPU 32 uses the wireless transceiver unit 36 to transmit the print reservation confirmation request to the proxy server 71.

Here, the second wait time of the print reservation confirmation timer is set longer than the first wait time of the print data acquisition timer. In this way, the polling for print data acquisition (S142) can be performed more frequently than the polling for confirming whether the mobile telephone 10 has issued a print reservation (S164).

In S166 the CPU 32 determines whether the response data was received from the proxy server 71. The CPU 32 continually loops back to S166 while the response data has not been received (S166: NO) and advances to S168 when the response data was received (S166: YES).

In S168 the CPU 32 determines whether a print reservation has been issued. More specifically, the CPU 32 determines whether the response data received from the proxy server 71 indicates that the printing status is "print reservation exists." If the status is "print reservation does not exist" (S168: NO), in S170 the CPU 32 sets the print reservation confirmation timer and returns to S110 (see FIG. 5). However, if the status indicates "print reservation exists" (S168: YES), in S172 the CPU 32 uses the wireless transceiver unit 36 to transmit a print data request to the proxy server 71.

In S174 the CPU 32 determines whether the request-received notification was received from the proxy server 71. The CPU 32 continually loops back to S174 while the request-received notification has not been received (S174: NO) and advances to S176 when the notification has been received (S174: YES). In S176 the CPU 32 sets the print data acquisition timer and cancels all other timers. Subsequently, the CPU 32 returns to S110 (see FIG. 5).

Operations of the Mobile Telephone

Figure 8:
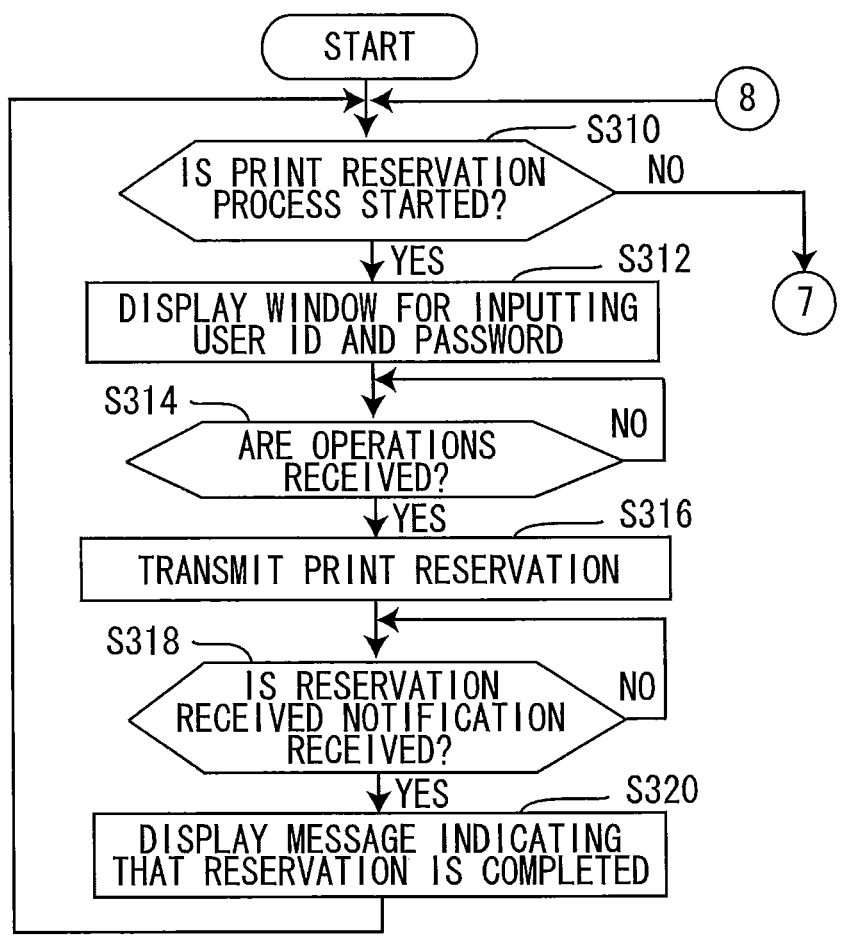
FIG. 8 is a flowchart illustrating an anterior half of a whole process of a mobile telephone.

Next, the operations of the mobile telephone 10 will be described with reference to the flowcharts in FIGS. 8 and 9. The process described in FIGS. 8 and 9 begins when the mobile telephone 10 is started. In S310 of FIG. 8, the CPU 11 determines whether a print reservation process has been started. The print reservation process is performed to control the MFP 51 to print the print data.

When the CPU 11 determines that the print reservation process has begun (S310: YES), in S312 the CPU 11 displays a window on the panel 18 for inputting the user ID data and the password. When the user has registered the MFP 51 on the proxy server 71, the MFP 51 displays the user ID data received from the proxy server 71 on the display panel 39 in S118. When the MFP 51 is registered on the proxy server 71, in S120 the user inputs the password and the mobile telephone address through the button input unit 38. Hence, the user that registered the MFP 51 on the proxy server 71 can input through the button input unit 17 of the mobile telephone 10 the user ID data displayed in the display panel 39 of the MFP 51 and the password registered on the proxy server 71 through the button input unit 38 of the MFP 51.

In S314 the CPU 11 determines whether operations performed by the user to input the user ID data and the password were received through the button input unit 17. The CPU 11 continually loops back to S314 while the input has not been received (S314: NO) and advances to S316 when the input has been received (S314: YES). In S316 the CPU 11 transmits a print reservation including the inputted user ID data and the password to the proxy server 71. Note that the URL of the proxy server 71 has already been stored in the mobile telephone 10 and the CPU 11 uses the URL of the proxy server 71 to transmit a print reservation according to HTTP.

In S318 the CPU 11 determines whether a reservation-received notification was received from the proxy server 71. The CPU 11 continually loops back to S318 while a reservation-received notification has not been received (S318: NO) and advances to S320 when a notification has been received (S318: YES). In S320 the CPU 11 displays a message on the panel 18 indicating that the reservation has been completed and subsequently returns to S310.

However, if the CPU 11 determines in S310 that a print reservation process has not been initiated (S310: NO), in S330 (see FIG. 9) the CPU 11 determines whether the print data request was received from the proxy server 71. If a print data request was received (S330: YES), in S331 the CPU 11 uses the mobile telephone transceiver unit 22 to transmit data to the proxy server 71 indicating that the print data request was received.

In S332 the CPU 11 displays a window on the panel 18 for selecting print data to be transmitted. In S334 the CPU 11 determines whether a selection of print data was made through the button input unit 17. The CPU 11 continually loops back to S334 while the selection has not been made (S334: NO) and advances to S336 when the selection has been made (S334: YES). In S336 the CPU 11 controls the mobile telephone transceiver unit 22 to transmit the selected print data to the proxy server 71 using the proxy server address. The print data is transmitted through e-mail using the proxy server address as the transmission destination and the mobile telephone address as the transmission source. In S337 the CPU 11 determines whether data indicating that the print data was successfully received is received from the proxy server 71. The CPU 11 continually loops back to S337 while such data has not been received (S337: NO) and returns to S310 when the data has been received (S337: YES).

On the other hand, if the CPU 11 determines in S330 that the print data request was not received (S330: NO), in S340 the CPU 11 determines whether a process to register a proxy server address has been initiated. The process to register a proxy server address is performed to register the proxy server address in order to make use of the printing system 1. Here, the proxy server address is the e-mail address of the proxy server 71. If the process to register the proxy server address has not been initiated (S340: NO), in S350 the CPU 11 executes other processes and subsequently returns to S310 (see FIG. 8).

However, if the process to register the proxy server address has begun (S340: YES), in S342 the CPU 11 displays a window on the panel 18 for inputting the proxy server address. At this time, the user who registered the MFP 51 on the proxy server 71 can input the proxy server address displayed in the display panel 39 of the MFP 51 through the button input unit 17 of the mobile telephone 10. In S344 the CPU 11 determines whether the proxy server address has been inputted through the button input unit 17 and continually loops back to S344 while the proxy server address has not been inputted (S344: NO). When the proxy server address has been inputted (S344: YES), in S346 the CPU 11 records the inputted proxy server address in the storage unit 12 and subsequently returns to S310.

Sample Operations of the Printing System

Next, a sample operation performed on the printing system 1 will be described with reference to a sequence diagram in FIG. 10. When the use registration process is started on the MFP 51 at a time T1 (S110: YES), the MFP 51 transmits a use registration request to the proxy server 71 (S112). After the proxy server 71 receives the use registration request (S210: YES), the proxy server 71 reads the MFP identification data from the use registration request and stores this data in the storage unit 73 (S212). The proxy server 71 also generates the user ID data and stores this data in the storage unit 73 (S214). Next, the proxy server 71 transmits the user ID data and the proxy server address to the MFP 51 (S216). The MFP 51 stores the user ID data and the proxy server address received from the proxy server 71 in the storage unit 33 (S116). The MFP 51 transmits the user-inputted password and the mobile telephone address to the proxy server 71 (S122). The proxy server 71 stores the password and the mobile telephone address received from the MFP 51 in the table storage area 12b (S220). Next, the proxy server 71 sets the printing status to the "initial state."

When the timing arrives for the print reservation confirmation at a time T2 (S160: YES), the MFP 51 transmits the print reservation confirmation request to the proxy server 71 (S164). After receiving the print reservation confirmation request (S240: YES), the proxy server 71 confirms the printing status (S244). Since the printing status is not the "printing-reserved state" (S244: NO), the proxy server 71 transmits response data to the MFP 51 indicating "print reservation does not exist" (S248). Thus, the MFP 51 determines that the print reservation has not been made (S168: NO) and sets the print reservation confirmation timer (S170).

At a time T3 when a print reservation process is started on the mobile telephone 10 (S310: YES), the mobile telephone 10 transmits the print reservation to the proxy server 71

(S316). Upon receiving the print reservation (S230: YES), the proxy server 71 changes the printing status to the "printing-reserved state" (S232).

At a time T4 when the timing of the print reservation confirmation has arrived (S160: YES), the MFP 51 transmits the print reservation confirmation request to the proxy server 71 (S164). Upon receiving the print reservation confirmation request (S240: YES), the proxy server 71 reconfirms the printing status (S244). Since the printing status is now the "printing-reserved state" (S244: YES), the proxy server 71 transmits response data to the MFP 51 indicating "print reservation exists" (S246). The MFP 51 determines that the print reservation has been made (S168: YES) and transmits the print data request to the proxy server 71 (S172). Upon determining that the print data request was received from the MFP 51 (S260: YES), the proxy server 71 transmits the print data request to the mobile telephone 10 (S268). Subsequently, the mobile telephone 10 receives the print data request (S330: YES).

At a time T5 when the timing for the print data acquisition has arrived (S140: YES), the MFP 51 transmits a print data acquisition request to the proxy server 71 (S142). Upon receiving the print data acquisition request (S280: YES), the proxy server 71 confirms the printing status (S282). Since the current printing status is not the "data-provision waiting state" (S284: NO), the proxy server 71 transmits data to the MFP 51 indicating that no print data is currently stored (S289).

At a time T6 when the mobile telephone 10 transmits print data to the proxy server 71 (S336), the proxy server 71 receives (S270: YES) and stores the print data (S276).

At a time T7 when the timing for print data acquisition has arrived (S140: YES), the MFP 51 retransmits the print data acquisition request to the proxy server 71 (S142). Upon receiving the print data acquisition request (S280: YES), the proxy server 71 confirms the printing status (S282). Since the printing status is currently the "data-provision waiting state" (S284: YES), the proxy server 71 transmits the print data to the MFP 51 (S286) and changes the printing status to the "initial state" (S288). The MFP 51 receives the print data (S146: YES), and executes a printing operation based on this print data (S150).

Effects of the Printing System

The printing system 1 according to the embodiment described above has the following effects. When the proxy server 71 receives a print reservation from the mobile telephone 10 (S230: YES) and when the proxy server 71 receives a print data request from the MFP 51 (S260: YES), the proxy server 71 transmits a print data request to the mobile telephone 10 (S268). Upon receiving the print data request (S330: YES), the mobile telephone 10 transmits the print data to the proxy server 71 (S336). The proxy server 71 relays the print data received from the mobile telephone 10 to the MFP 51 (S286).

Through this method, the proxy server 71 need not store actual print data in the storage unit 73 during the period after the mobile telephone 10 has outputted a print reservation and until the print data is received by the proxy server 71, but may simply store "printing-reserved state" as the printing status associated with the MFP identification data identified by user ID data and a password included in the print reservation. Since the volume of data used in the printing status is much smaller than that of the print data, this technique helps avoid such problems as insufficient storage space in the storage unit 73 of the proxy server 71.

Further, the proxy server 71 in the embodiment can identify the printing system 1 or the MFP 51 based on the received print reservation or the print data request. Accordingly, the communication of print reservations, print data, and the like between the mobile telephone 10 and the MFP 51 can be performed through the proxy server 71.

Further, polling for print data acquisitions (S142) is performed by the MFP 51 at a greater frequency than polling to confirm whether the mobile telephone 10 has issued a print reservation (S164). This configuration prevents an increase of traffic on the proxy server 71 and can reduce the time required for receiving print data.

Variations of the Embodiment

While the invention has been described in detail with reference to the embodiment thereof, it would be apparent to those skilled in the art that various changes and modifications may be made therein without departing from the scope of the invention.

The printing system 1 may be configured to display a preview of print data on the MFP 51 based on a command from the mobile telephone 10. In this variation, the mobile telephone 10 may generate preview data from the print data such that the preview data is smaller in size than the print data. For example, the preview data may be of a size sufficient for displaying a thumbnail image in the display panel 39 of the MFP 51. In S316 (see FIG. 8), the mobile telephone 10 may transmit the preview data to the proxy server 71 together with a print reservation. The proxy server 71 receives the print reservation and preview data in S230 (see FIG. 2) and stores this data in the storage unit 73.

In another variation for displaying a preview, in S316 (see FIG. 8) the mobile telephone 10 may be configured to transmit data specifying the location of preview data to the proxy server 71 together with a print reservation. An example of data indicating the location of the preview data is a URL specifying the region on a server in which the preview data is stored. In this case, the proxy server 71 receives the URL and print reservation in S230 (see FIG. 2), acquires the preview data using the URL, and stores the preview data in the storage unit 73.

In another variation for displaying a preview, in S316 (see FIG. 8) the mobile telephone 10 may transmit the print data itself to the proxy server 71 together with a print reservation. In this case, the proxy server 71 receives the print data in S230 (see FIG. 2) and stores the print data in the storage unit 73. The proxy server 71 subsequently generates preview data based on the stored print data and deletes the print data after the preview data has been generated.

Figure 3:
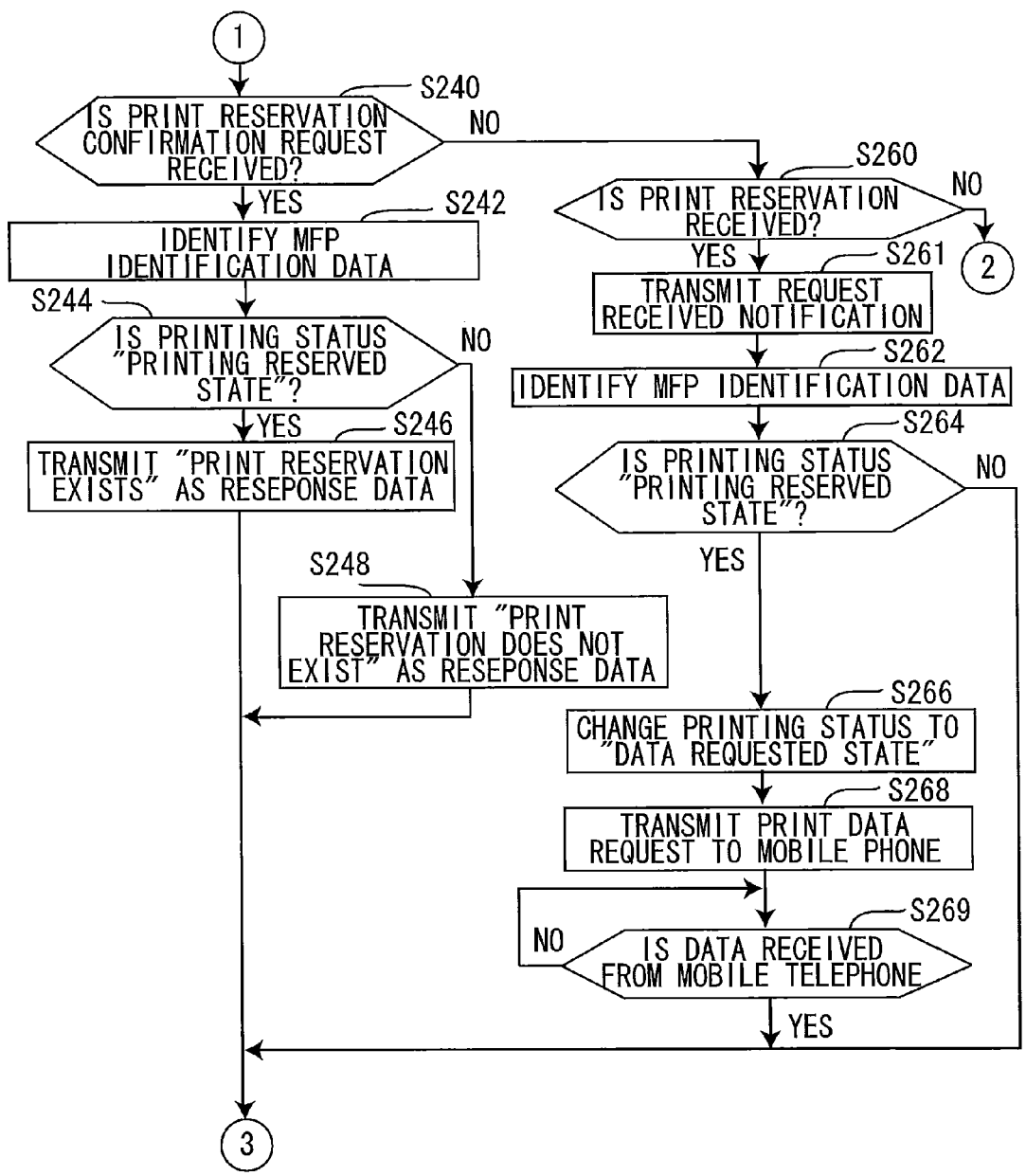
FIG. 3 is a flowchart illustrating a second part of the whole process of the proxy server that is subsequent to the first process.
Figure 4:
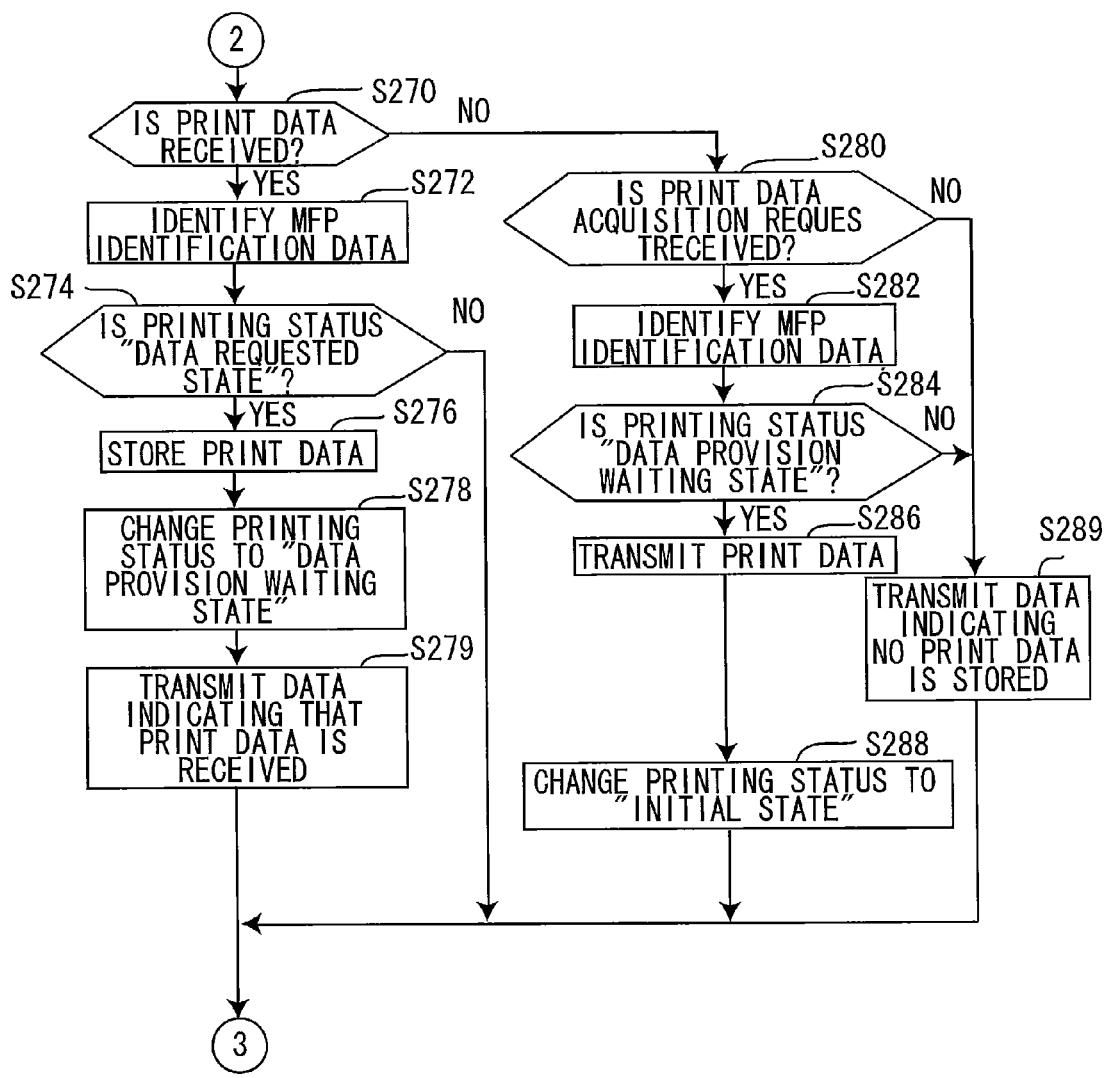
FIG. 4 is a flowchart illustrating a third part of the whole process of the proxy server that is subsequent to the second process.

In all of the variations for displaying a preview of the image to be printed, the proxy server 71 transmits response data specifying "print reservation exists" together with the preview data stored in the storage unit 73 to the MFP 51 in S246 (see FIG. 3). When the MFP 51 determines in S168 (see FIG. 7) that the status is "print reservation exists," the MFP 51 displays a thumbnail image on the display panel 39 based on the preview data, and waits for input indicating whether or not to print the image. When the user inputs a command to execute the printing operation, the MFP 51 advances to S172 and transmits a print data request to the proxy server 71. In this way, the MFP 51 can display a preview of the print data so that the user can determine whether or not to print the image. In S246, the proxy server 71 may transmit the location of the preview data, and in S168 the MFP 51 may acquire the preview data based on the location of the preview data.

In the embodiment described above, the print reservation includes data identifying the mobile telephone 10 and data identifying the MFP 51. Here, the data identifying the mobile telephone 10 is a mobile telephone address, and data identifying the MFP 51 is user ID data and a password. However, the print reservation may instead include the user ID data but not the mobile telephone address, for example. In this case, the CPU 72 identifies the mobile telephone address stored in the table storage area 12b in association with user ID data identical to the user ID data included in the print reservation and uses this identified mobile telephone address in subsequent processing. Alternatively, the print reservation may include the mobile telephone address but not the user ID data. In this case, the CPU 72 identifies the user ID data stored in the table storage area 12b in association with a mobile telephone address identical to the mobile telephone address included in the print reservation and uses this user ID data in subsequent processing.

Figure 2:
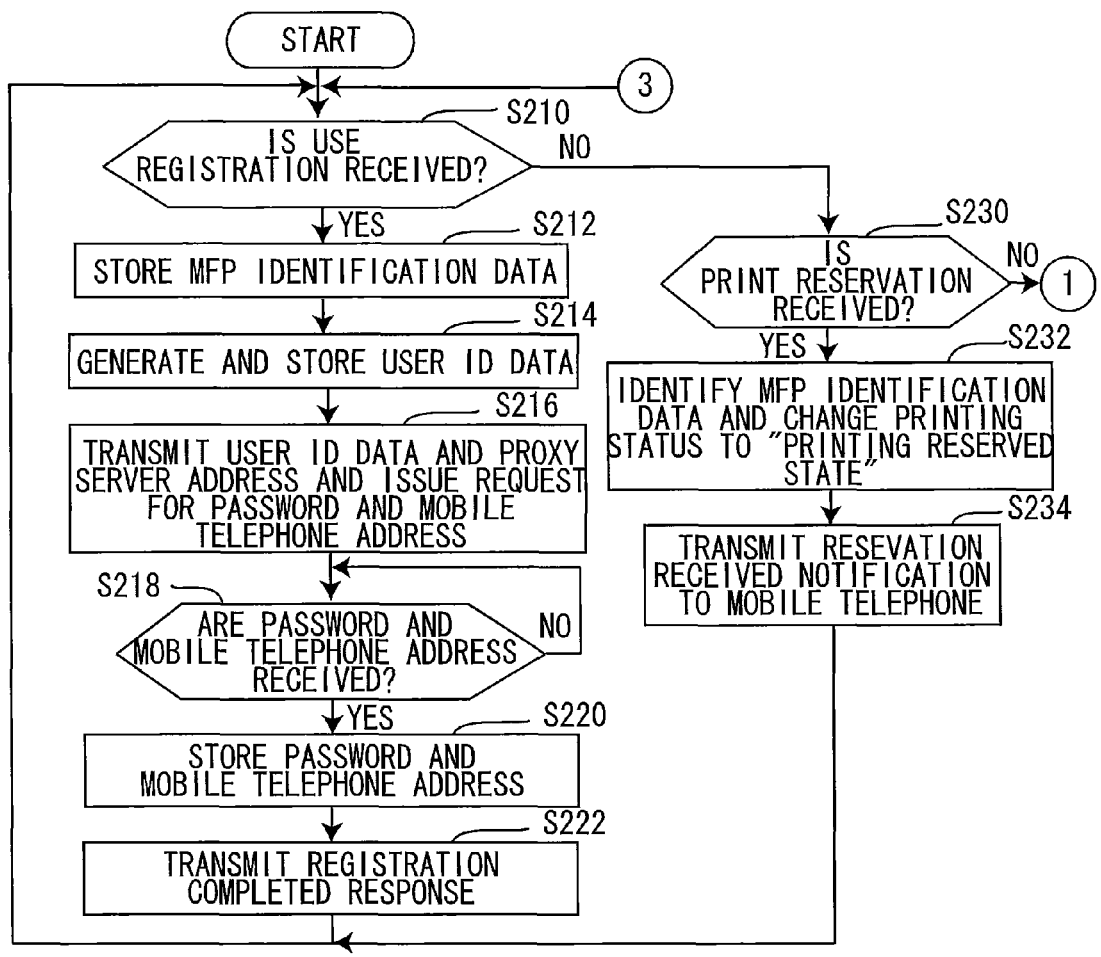
FIG. 2 is a flowchart illustrating a first part of a whole process of the proxy server.

There are various methods in which the proxy server 71 can store each sets of data such that the each sets of data is associated with each other in S220 of FIG. 2. For example, the MFP identification data may be associated with the user ID data and password by storing the data in sequential memory addresses. Alternatively, the memory address at which the MFP identification data is stored and the memory address at which the user ID data and password are stored may be stored such that these memory addresses are associated with each other. The same method may be used for storing the data identifying the MFP 51 and data identifying the mobile telephone 10 such that the data identifying the MFP 51 is associated with the data for identifying the mobile telephone 10. Here, the data identifying the MFP 51 is MFP identification data, user ID data, and password, and the data identifying the mobile telephone 10 is mobile telephone address.

Further, the table storage area 12b for storing various correlated data need not be provided in the proxy server 71, but may be provided in external storage means, such as network storage that is accessible to the proxy server 71.

Further, the mobile telephone address is data used for identifying the mobile telephone 10, but may also be considered data for identifying the user of the mobile telephone 10. Hence, any data capable of identifying the mobile telephone 10, such as a MAC address, an IP address, a serial number of the mobile telephone 10, a telephone number of the mobile telephone 10, or a user code for the mobile telephone 10, may be used in place of the e-mail address.

The MFP identification data is not limited to a serial number. Any data capable of identifying individual MFPs may be used as the MFP identification data, such as a MAC address, an IP address, or a node name.

Further, the CPU 72 may also return to S210 from S232 when determining that the mobile telephone address associated with the user ID data and password included in the print reservation is not stored in the table storage area 12b. In other words, when the print reservation received from the mobile telephone 10 does not include the mobile telephone address received from the MFP 51 when the use registration process was performed for the MFP 51, it is possible that the print reservation was not received from a valid user. Therefore, in S232 the CPU 72 does not recognize the received print reservation as a valid reservation.

Further, when the CPU 72 does not recognize the received print reservation as a valid reservation in S232, the CPU 72 may control the communication unit 74 to transmit a reservation-denied notification to the mobile telephone 10.

Further, while the mobile telephone 10 transmits print data using e-mail in S336 (see FIG. 9), another method may be used to transmit print data, provided that the source of the communication can be identified. The proxy server 71 may also be configured to store data for identifying the mobile telephone 10 used for communication purposes, in the same way that the mobile telephone address was stored in the embodiment, in association with data identifying the MFP 51 when performing the use registration process for registering the MFP 51 on the proxy server 71. Here, the data identifying the MFP 51 is the MFP identification data, user ID data, and password. By storing data identifying the mobile telephone 10 for communication purposes, the proxy server 71 can identify mobile telephones that are the source of a transmission, regardless of the method of communications.

Further, the proxy server 71 may store any type of data for identifying the mobile telephone 10, such as the IP address of the mobile telephone 10, in association with data identifying the MFP 51 during the use registration request for the MFP 51, even when employing a method of communication with which the transmission source is difficult to identify. As long as the mobile telephone 10 transmits data capable of identifying the mobile telephone 10 with the print data, the proxy server 71 can identify the transmission source by comparing this data to the stored data.

Figure 9:
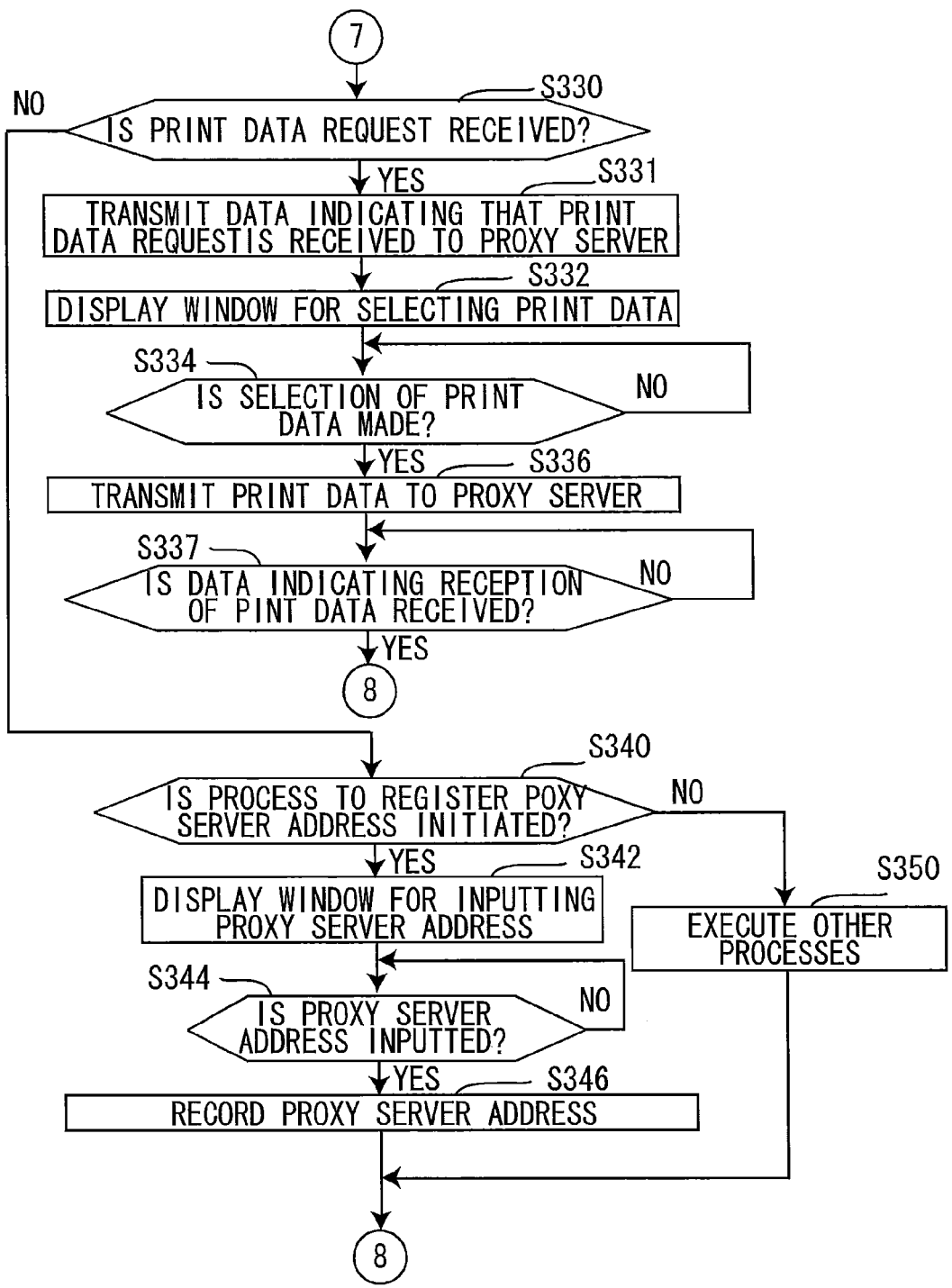
FIG. 9 is a flowchart illustrating a posterior half of the whole process of the mobile telephone.

There are a variety of other configurations possible for transmitting print data from the mobile telephone 10 to the proxy server 71 in S336 (see FIG. 9). For example, when the mobile telephone 10 receives a print data request from the proxy server 71 in S330, the mobile telephone 10 may be configured to return the print data to the proxy server 71 automatically.

Alternatively, in S336 the mobile telephone 10 may be configured to transmit data indicating the location of the print data to the proxy server 71, such as a URL for the print data. With this configuration, the proxy server 71 acquires the print data in S286 using the data specifying the location of the print data, and transmits the acquired print data to the MFP 51.

The source from which the proxy server 71 acquires data required to communicate with the mobile telephone 10 may also be the mobile telephone 10 and is not limited to the MFP 51. For example, in S218 (see FIG. 2) the proxy server 71 need not receive the mobile telephone address from the MFP 51. In this case, in S220 the proxy server 71 stores only the received password in the storage unit 73. In S230 the proxy server 71 stores a mobile telephone address included in a print reservation received from the mobile telephone 10 in the table storage area 12b of the storage unit 73 in association with data identifying the MFP 51. Further, in S268 the proxy server 71 may transmit a print data request received from the MFP 51 to the mobile telephone 10 using the mobile telephone address included in the print reservation received from the mobile telephone 10, for example.

The proxy server 71 may also be configured to generate a unique reservation number for each print reservation received from the mobile telephone 10 and may use this reservation number as the data identifying the MFP 51 in place of the user ID data. The proxy server 71 may also delete a reservation number used as the data for identifying the MFP 51 after transmitting print data to the MFP 51, and may generate separate reservation numbers for new print reservations.

In the embodiment, the mobile telephone 10 transmits data indicating a print request, the mobile telephone address of the mobile telephone 10, and user ID data and a password for the MFP 51 to the proxy server 71 as a print reservation, and the proxy server 71 confirms the MFP identification data associated with the user ID data and password in S232. However, the mobile telephone 10 may be configured not to transmit user ID data for the MFP 51 to the proxy server 71 in the print reservation. In this case, in S232 the proxy server 71 may be configured to confirm the MFP identification data associated with the mobile telephone address included in the print reservation, in order to identify the MFP 51. Also in this case, the proxy server 71 need not generate user ID data in the use registration process.

The invention is not limited to a printing system 1 that includes a single mobile telephone 10 and a single MFP 51, but may also be applied to a printing system 1 possessing a plurality of either or both. In such a system, the proxy server 71 can receive print data from an unspecified number of mobile telephones 10 and can transfer this print data to MFPs 51 associated with each of the mobile telephones 10.

The printing system 1 according to the embodiment controls the MFP 51 to print the print data based on a command configured of a print reservation from the mobile telephone 10. However, the invention may be applied to a display system for controlling the MFP 51 to display image data based on a command received from the mobile telephone 10. In this case, when the proxy server 71 receives a display reservation from the mobile telephone 10 (S230: YES) and receives an image data request from the MFP 51 (S260: YES), the proxy server 71 transmits the image data request to the mobile telephone 10 (S268). Upon receiving this image data request (S330: YES), the mobile telephone 10 transmits image data to the proxy server 71 (S336). The proxy server 71 transmits the image data received from the mobile telephone 10 to the MFP 51 (S286). Next, the MFP 51 displays the image data received from the proxy server 71 on the display panel 39 (S150). With this configuration, the proxy server 71 need not store image data in the storage unit 73 during the period after receiving a display reservation from the mobile telephone 10 until image data is received from the mobile telephone 10.

The programs in the embodiment may also be configured as a single program module, or as a plurality of program modules. Each of the portions and the processes in the embodiment given above may be replaced with a different configuration within the scope of the invention. For example, a computer (e.g., the CPU 72) may execute a process based on an image-processing program (e.g., the printing application 28). The computer may execute a process based on programs other than the image-processing program, such as the operating system or another application. A hardware configuration may be used to perform operations according to instructions from the computer. The computer and the hardware configuration may be designed to work together. A computer may also be used to execute a process by coordinating multiple processes based on a plurality of programs, and a hardware configuration may perform operations based on instructions from the computer executing a process by coordinating multiple processes based on the plurality of programs.

What is claimed is:

1. A proxy device comprising:
   a communication unit configured to communicate with a plurality of outputting devices and a plurality of instruction devices; and
   a processor functioning as:
   an acquiring unit acquiring at least one of outputting-device-identification data and instruction-device-identification data from a storing unit, the outputting-device-identification data identifying a particular outputting device from among the plurality of outputting devices, the instruction-device-identification data identifying a particular instruction device from among the plurality of instruction devices, the storing unit storing the outputting-device-identification data associated with the instruction-device-identification data;
   a first receiving unit receiving, via the communication unit, instruction-device-identification data and instruction data;
   a first determining unit determining whether the acquired outputting-device-identification data is associated with the received instruction-device-identification data;
   a first transmitting unit transmitting, via the communication unit, the received instruction data to the particular outputting device in response to determining that the particular outputting device identified by the acquired outputting-device-identification data is associated with the received instruction-device-identification data in the storing unit, the instruction data instructing the determined outputting device to output an image;
   a second receiving unit receiving, via the communication unit, response data from the particular outputting device in response to the instruction data transmitted by the first transmitting unit;
   a second transmitting unit transmitting, via the communication unit, the received response data to the instruction device from which the received instruction data is transmitted;
   a third receiving unit receiving, via the communication unit, specific data that is transmitted from the instruction device in response to the response data transmitted to the instruction device by the second transmitting unit, the specific data being one of output data based on which the outputting device outputs an image and location data indicating a location in which the output data is stored; and
   a third transmitting unit transmitting the received specific data to the particular outputting device.

2. The proxy device according to claim 1, wherein the processor further functions as:
   a fourth receiving unit receiving first request data from the outputting device, the first request data requesting to store, in the storing unit, the received outputting-device-identification data in association with instruction-device-identification data; and
   a registering unit storing, in the storing unit, the received outputting-device-identification data in association with the instruction-device-identification data in response to the first request data.

3. The proxy device according to claim 1,
   wherein a plurality of sets of the instruction-device-identification data is stored in the storing unit, and
   wherein, when the instruction-device-identification data received by the first receiving unit does not coincide with any of the plurality of sets of instruction-device-identification data stored in the storing unit, the first transmitting unit does not transmit the instruction data.

4. The proxy device according to claim 1,
   wherein the second receiving unit receives the response data including identification data that identifies the outputting device,
   wherein the processor further functions as a second determining unit determining whether the outputting device identified by the received identification data included in the response data coincides with the outputting device identified by the outputting device identification data that is, in the storing unit, associated with the instruction-device-identification data received by the first receiving unit,
   wherein the second transmitting unit transmits the response data to the instruction device identified by the received instruction-device-identification data in response to determining the outputting device identified by the received identification data included in the response data coincides with the outputting device identified by the outputting device identification data that is, in the storing unit, associated with the instruction-device-identification data received by the first receiving unit.

5. The proxy device according to claim 1,
wherein the first receiving unit receives the instruction-device-identification data, the outputting-device-identification data, and the instruction data,
wherein the second receiving unit receives the response data including identification data that identifies the outputting device,
wherein the processor further functions as a third determining unit determining whether the outputting device identified by the identification data included in the response data coincides with the outputting device identified by the outputting-device-identification data received by the first receiving unit,
wherein the second transmitting unit transmits the response data to the instruction device identified by the received instruction-device-identification data in response to determining that the outputting device identified by the identification data included in the response data coincides with the outputting device identified by the outputting-device-identification data received by the first receiving unit,
wherein in response to receiving the specific data, the third transmitting unit transmits the specific data from the instruction device, to the outputting device identified by the identification data received as the response data by the second receiving unit.

6. The proxy device according to claim 5, wherein the processor further functions as:
a fourth receiving unit receiving first request data from the outputting device, the first request data requesting to store, in the storing unit, the received outputting-device-identification data in association with instruction-device-identification data; and
a registering unit storing, in the storing unit, the received outputting-device-identification data in association with the instruction-device-identification data in response to the first request data,
wherein the processor further functions as a fourth determining unit determining whether the instruction-device-identification data received by the first receiving unit coincides with the instruction-device-identification data stored in the storing unit,
wherein the first transmitting unit transmits the received instruction data to the outputting device identified by the outputting-device-identification data received by the first receiving unit in response to determining that the instruction-device-identification data received by the first receiving unit coincides with the instruction-device-identification data stored in the storing unit.

7. The proxy device according to claim 6, wherein a plurality of sets of the instruction-device-identification data is stored in the storing unit,
wherein the processor further functions as a fifth determining unit determining whether the outputting-device-identification data does not coincide with any of the plurality of sets of the instruction-device-identification data stored in the storing unit,
wherein the first transmitting unit does not transmit the instruction data in response to determining that the outputting-device-identification data does not coincide with any of the plurality of sets of the instruction-device-identification data stored in the storing unit.

8. The proxy device according to claim 2, wherein the processor further functions as:
a fifth receiving unit receiving, from the outputting device, second request data and outputting-device-identification data identifying the outputting device, the second request data requesting to record outputting-device identification data identifying the outputting device; and
a recording unit recording the outputting-device identification data in the storing unit in response to the request data received by the fifth receiving unit,
wherein in response to the first request data received by the fourth receiving unit, the registering unit stores the outputting-device-identification data recorded by the recording unit in association with the instruction device identification data.

9. The proxy device according to claim 1, wherein the processor further functions as:
a sixth receiving unit receiving, from the outputting device, third request data requesting to record instruction-device identification data;
a generating unit generating the instruction-device-identification data; and
a sixth transmitting unit transmitting the generated instruction-device-identification data to the outputting device from which the second request data is received.

10. The proxy device according to claim 1, wherein the processor further functions as:
a fifth receiving unit receiving, from the outputting device, second request data and outputting-device-identification data identifying the outputting device, the second request data requesting to record outputting-device identification data identifying the outputting device; and
a recording unit recording the outputting-device-identification data in the storing unit in response to the second request data received by the fifth receiving unit,
wherein the third transmitting unit transmits the received specific data to the outputting device identified by the outputting-device-identification data that is recorded in the storing unit, when the first receiving unit receives the instruction-device-identification data and the instruction data from the instruction device that has performed a recordation process for sending the instruction data to the outputting device identified by the outputting-device-identification data recorded in the storing unit.

11. The proxy device according to claim 1, wherein the processor further functions as a determining unit determines whether to allow the image outputting device to output the image,
wherein the response data is transmitted from the image outputting device of which the determining unit performs determination.

12. The proxy device according to claim 1, wherein the outputting device performs at least one of printing the image and displaying the image based on the output data.

13. The proxy device according to claim 1, wherein the instruction data includes one of the output data and preview data indicating a preview image of the output data,
wherein the processor further functions as:
a seventh receiving unit receiving preview request data from the outputting device; and
a seventh transmitting unit transmits one of preview data generated by the processor, preview data included in the instruction data, and preview acquiring data used to acquire preview data, to the outputting device from which the preview request data is received,
wherein the second transmitting unit transmits the received response data to the instruction device when the second receiving unit receives the response data from the outputting device to which the seventh transmitting unit transmits the one of the preview data generated by the processor, the preview data included in the instruction data, and the preview acquiring data used to acquire preview data.

14. The proxy device according to claim 13, wherein the processor further functions as:
   an image storing unit storing the output data included in the instruction data;
   a preview generating unit generating the preview data; and
   a deleting unit deletes the output data from the storing unit after the preview generating unit generates the preview data.

15. The proxy device according to claim 1, comprising the storing unit.

16. The proxy device according to claim 1, wherein the storing unit is provided on a network as a network storage device.

17. A system comprising a proxy server, a plurality of outputting devices communicable with the proxy server via a local area network and Internet, and a plurality of instruction devices communicable with the proxy server,
   the proxy device comprising:
   a communication unit configured to communicate with a plurality of outputting devices and a plurality of instruction devices; and
   a processor functioning as:
   an acquiring unit acquiring at least one of outputting-device-identification data and instruction-device-identification data from a storing unit, the outputting-device-identification data identifying a particular outputting device from among the plurality of outputting devices, the instruction-device-identification data identifying a particular instruction device from among the plurality of instruction devices, the storing unit storing the outputting-device-identification data associated with the instruction-device-identification data;
   a first receiving unit receiving, via the communication unit, instruction-device-identification data and instruction data;
   a first determining unit determining whether the acquired outputting-device-identification data is associated with the received instruction-device-identification data;
   a first transmitting unit transmitting, via the communication unit, the received instruction data to the particular outputting device in response to determining that the particular outputting device identified by the acquired outputting-device-identification data is associated with the received instruction-device-identification data in the storing unit, the instruction data instructing the determined outputting device to output an image;
   a second receiving unit receiving, via the communication unit, response data from the particular outputting device in response to the instruction data transmitted by the first transmitting unit;
   a second transmitting unit transmitting, via the communication unit, the received response data to the instruction device from which the received instruction data is transmitted;
   a third receiving unit receiving, via the communication unit, specific data that is transmitted from the instruction device in response to the response data transmitted to the instruction device by the second transmitting unit, the specific data being one of output data based on which the outputting device outputs an image and location data indicating a location in which the output data is stored; and
   a third transmitting unit transmitting the received specific data to the particular outputting device.

* * * * *